C. WYCKOFF, Jr.
Improvement in Combined Harrows.
No. 114,244. Patented April 25, 1871.

(As a Corn-Harrow, or Cultivator.)

(As a Follow Harrow, for Small Grain, &c.)

Witnesses
Warren Delarue.
M. A. Valentine.

Cornelius Wyckoff, Jr.
Inventor
by Edmund _____, his Atty in ____

United States Patent Office.

CORNELIUS WYCKOFF, JR., OF FAIRVIEW, ILLINOIS.

Letters Patent No. 114,244, dated April 25, 1871.

IMPROVEMENT IN COMBINED HARROWS.

The Schedule referred to in these Letters Patent and making part of the same.

*To all whom it may concern:*

Be it known that I, CORNELIUS WYCKOFF, Jr., of Fairview, in the county of Fulton and in the State of Illinois, have invented a new and useful Convertible Harrow, *i. e.*, a harrow whose parts can be changed to make another form of harrow for different purposes; and do hereby declare that the following is a full, clear, and exact description thereof, reference being had to the annexed drawing making a part of this specification, in which like letters of reference refer to like parts, and in which—

Figure 1:
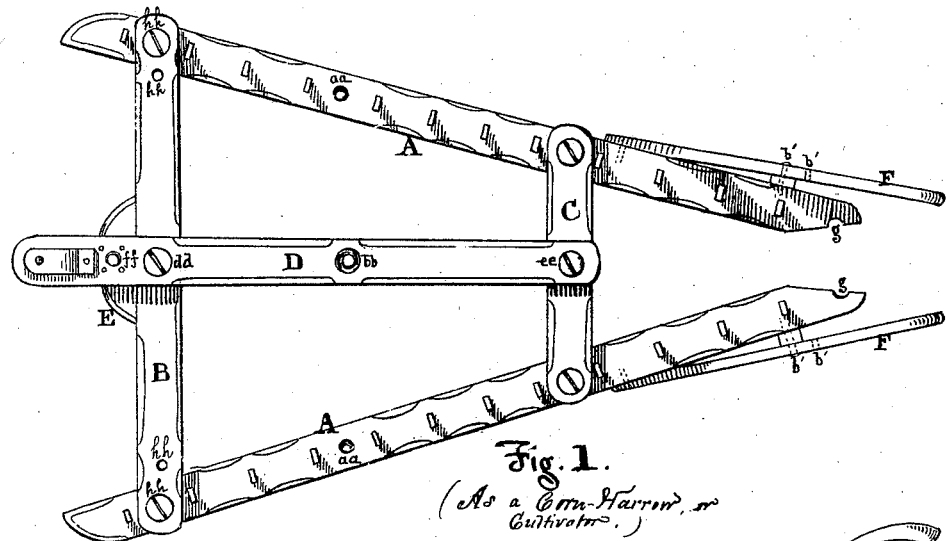

Figure 1 represents a plan.

Figure 2:
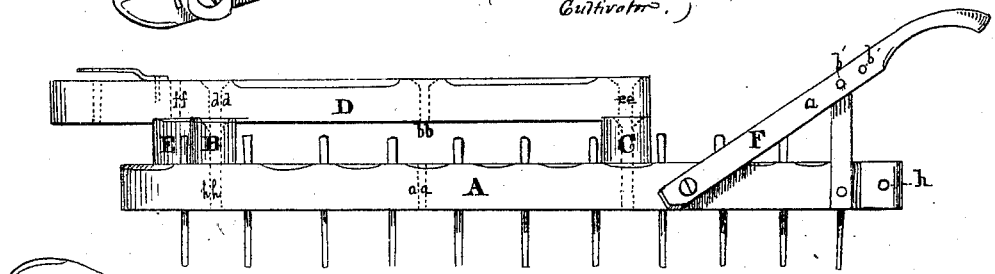

Figure 2, an elevation, (longitudinal.)

Figure 3:
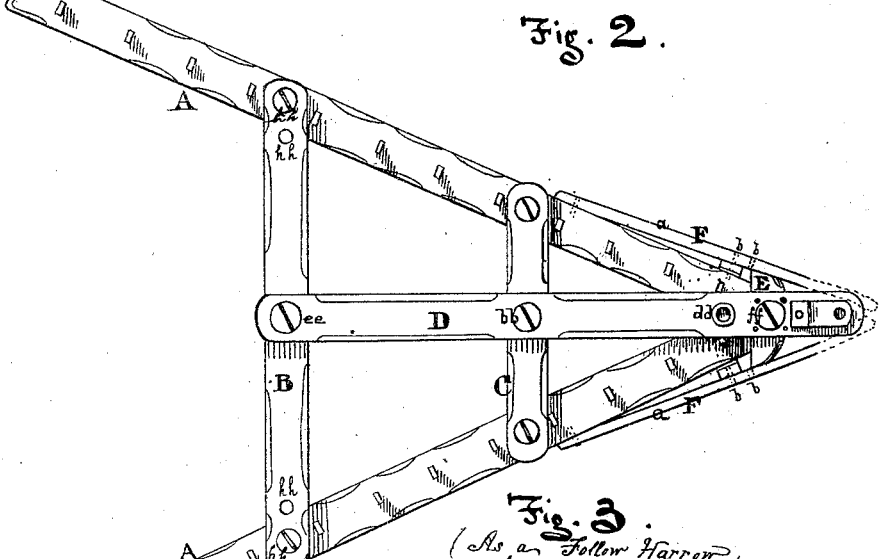

Figure 3, a plan of the same, altered by change of position of parts to make a follow-harrow for harrowing small grain, whereas figs. 1 and 2 represent the harrow as a corn-harrow.

This harrow consists in so constructing and proportioning the length of its component parts as to fit it, by a slight change of said parts, for either a corn-harrow or cultivator or a follower-harrow, for harrowing small grain. In each case the harrow is drawn in a different direction, so that the teeth are worn in two directions and thus sharpen themselves.

Figs. 1 and 2 represent the harrow as a corn-harrow or cultivator, of a triangular form.

A A are the two longest sides of the same, each being fitted with the usual teeth or with small shovels, said sides being bolted or screwed to the front cross-bar B, the rear ends being separated far enough to allow of their passage along each side of a corn-row so as to cultivate close to the corn.

B represents a cross-bar, perforated with holes *d d h h h h h h h*, and is bolted in this case at either end to the top of the side bars A A, the holes *h h h h h h h h* being for its adjustment to a narrower width of the bars A A.

C is a shorter cross-bar, bolted above and to the latter bars, by either end, near their rear ends.

D is a longitudinal central bar, acting as a brace, and prolonged forward for the attachment to it of the draft, and bolted at its rear end to the middle of the rear bar C at *e e*, and to the front cross-bar B at *d d*, and intersecting both bars at a right angle.

It has a hole, *b b*, for a bolt in its middle part.

Beneath the forward end of this bar, and fastened to it and fitting against the front side of the bar B, is a brace-block, E, through which and the bar D is a bolt-hole, *f f*, used as afterward stated.

F F are guiding-handles, adjusted to different heights by means of a pin and the bolt or pin-holes *b b b b*.

Fig. 3 represents the change of above harrow or cultivator to a follower-harrow for small grain.

The side bars A A, carrying the teeth, are here brought together at their handle ends, and now form the front of the harrow, the handles remaining in their places, but not used, (in this form of harrow.)

The cross-bar B is moved toward the center of the harrow, and is bolted through either of the holes *h h h h h h h h*, at the option of the operator.

The bar C retains its place, not being removed in either form of harrow.

The bar D is reversed, and the draft end, carrying the block E, is bolted through the latter, at *f f*, into the holes *g g* now formed by the meeting of the respective half-hole *g g* of the bars A A. The block raises this end of the bar D, preventing the front of the harrow from being raised at its point out of the soil by raising the draft.

The central holes *b b* are now used to bolt the bar C and those at *e e* to the middle of the cross-bar B.

The harrow is now available for tilling small grain.

The operation of this harrow needs little further description.

It will be seen that the harrow can be gauged, by means of the holes *h h h h, a a*, &c., to suit the width of corn-rows, and will harrow the "dead-furrow," as well as the hill or ridge, at the same operation.

There are no tenons or mortises, and being simply bolted together the machine is rendered easily changeable into either of the above forms by reversing the bar D, and moving the bar B to the holes *a a a a* of the side bars A A, to make the harrow in fig. 3.

What I claim in my invention as new is—

The combination and construction of the bars A A, with their adjustment-holes *h h h h a a g g* and their handles F F, with the cross-bar B, with its adjustment-holes *h h h h h h h h, d d, f f*, and *e e*, and its block E, the cross-bar C, all adjustable to convert the harrow into either a corn-harrow or cultivator, or into a harrow for harrowing small grain, &c., as described.

In testimony that I claim the foregoing harrow I have hereunto set my hand this 7th day of March, A. D. 1871.

CORNELIUS WYCKOFF, JUNR.

Witnesses:
PETER J. HERDER,
REED F. HILLPOT.